F. G. AGRELL.
SOAP DISPENSING MACHINE.
APPLICATION FILED JUNE 14, 1907.
969,830.
Patented Sept. 13, 1910.
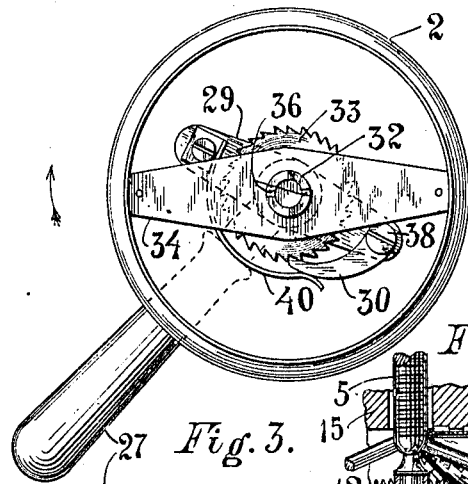
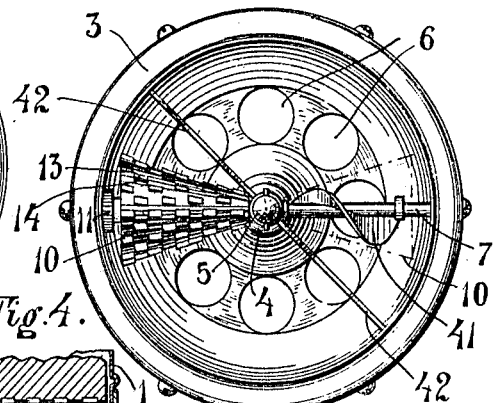
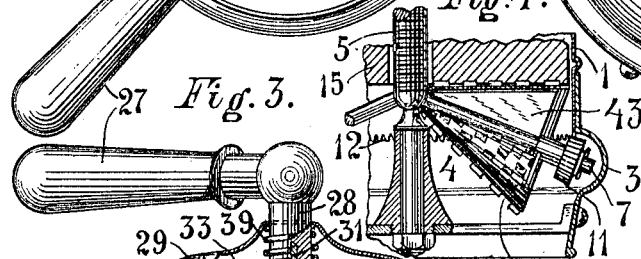
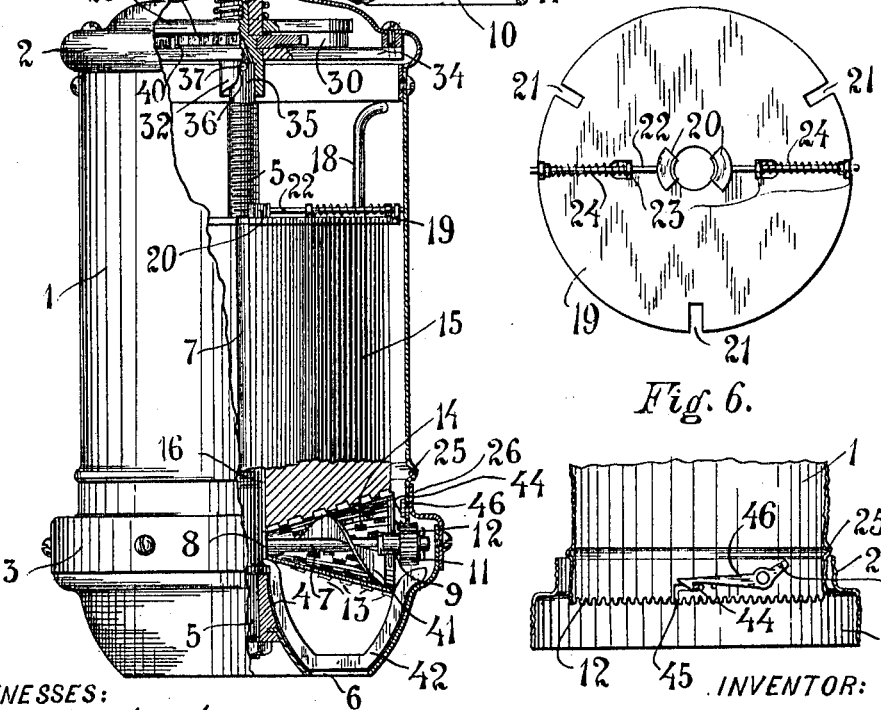
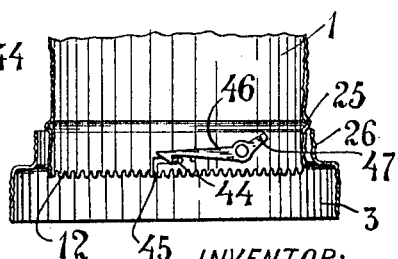
WITNESSES:
B. W. Couldock.
J. Edw. Golden.
INVENTOR:
Frans Gunnar Agrell.
BY
Lewis J. Doolittle
ATTORNEY.

UNITED STATES PATENT OFFICE.

FRANS GUNNAR AGRELL, OF STOCKHOLM, SWEDEN, ASSIGNOR TO LEWIS J. DOOLITTLE, OF BROOKLYN, NEW YORK.

SOAP-DISPENSING MACHINE.

969,830.  Specification of Letters Patent.  Patented Sept. 13, 1910.

Application filed June 14, 1907. Serial No. 379,027.

*To all whom it may concern:*

Be it known that I, FRANS GUNNAR AGRELL, a subject of the King of Sweden, and a resident of Stockholm, Sweden, have invented certain new and useful Improvements in Soap-Dispensing Machines, of which the following is a specification.

This invention relates to devices for dispensing soap and materials of similar consistency from a cake in such a form that the same will lather freely and has for its object the provision of means whereby the efficiency of such devices is greatly increased.

In my co-pending application Ser. No. 379,026, I have shown a device in which the soap is cut from the cake by the action of cylindrical cutters having a planetary movement. The present invention is a modification of said device and employs conical shaped cutters having similar movement. The conical shape is for the purpose of maintaining the same ratio between the cutting speed and the speed with which the cutter advances over the surface of the cake of soap to be cut for all cutting edges independently of their distance from the central axis of the planetary movement. This arrangement has also another advantage which is that said axis, which may be the same as the length of the device, can be arranged in a vertical position, which is not practical with the cylindrical form of cutters on account of the delivery of the soap particles after being cut from the cake.

Other objects and results obtained with this device will be in part obvious and in part pointed out in connection with the following description of one embodiment of my invention illustrated in the accompanying drawing.

In the drawing like parts have been given similar reference numbers in the several views.

Figure 1 is a plan view of the top portion of the device seen from the inside. Fig. 2 is a plan view of the bottom part of the device. Fig. 3 is a side elevation of the device, partially in section. Fig. 4 is a sectional side elevation of a part of a device showing a modified arrangement of the cutters. Fig. 5 is a detail plan view of the feeding disk. Fig. 6 is a side elevation of a part of the device showing a locking arrangement.

In the drawings at 1 is shown a cylindrical receptacle having end portions 2 and 3. The lower end 3 may be fastened in any desired location, such as to a washstand, by means of a suitable bracket not shown in the drawing. The receptacle 1 and cover 2 are secured together so that the same may be removed from the lower end 3 for filling the device. The lower end 3 is provided with a bearing 4 in which a shaft 5 is mounted and is also provided with openings 6 which permit the soap as cut from the cake to fall into the hand of the operator. Attached to said shaft 5 is a cross-shaft 7 upon which the hubs 8 and 9 of two conical drum shaped cutters 10 are rotatably mounted. Pinions 11 attached to the hubs 9 of the cutters operate to rotate the cutters when revolved upon the circular rack 12, which may be made as shown in the drawing by providing teeth at the lower end of the cylindrical receptacle 1.

The cutter is provided with a plurality of cutting edges 13 distributed over the curved surface of the conical drum which may be made by punching up portions of the wall of the drum, leaving an opening, such as shown at 14, in front of each cutting edge so that the soap particles when cut may enter the drum. Upon the upper cutting edges rests the cake of soap 15 which has a central bore 16 for the shaft 5 and three grooves 17 fitting the rods 18 which are attached to the receptacle 1 and prevent the soap from turning during the operation of the cutters.

A feeding disk 19, shown in Fig. 5, is provided with two threaded segments 20 adapted to engage the threaded shaft 5 and serves to hold the soap against the cutter. Recesses 21 adapted to be engaged by the rods 18 prevent the disk from turning when the shaft 5 is rotated. The segments 20 are attached to rods 22 slidably mounted in projections 23 from the disk 19 and when free are normally moved away from the center by means of the springs 24. The rods 22 are of such a length that when the disk is in position, as shown in Fig. 3, the wall of the receptacle 1 presses the rods toward the center so that the threaded segments 20 engage the threaded shaft 5.

A groove or recess 25 is formed at the lower end of the receptacle 1 and when the soap is nearly consumed, the feeding disk will have descended so that the rods 22 reach and enter the groove 25, allowing the springs 4 to move segments 20 out of engagement with the threaded shaft 5 so that the feeding is discontinued. If the receptacle and cover 1 and 2 are removed before the feeding disk has reached said position, the disk will continue to be engaged by the shaft 5, which remains in position, and the wall of the receptacle 1 will slide over the rods 22 until the groove 25 reaches the rods 22 when the disk will be released from the shaft and will remain in the receptacle 1 when the same is removed so that the cake of soap can be easily renewed.

When the receptacle 1 is replaced after a cake of soap has been placed in position or inspected the disk 19 will be arrested when it reaches the soap and the rods 22 will be moved out of the groove 25, causing the threaded segments 20 to again engage the shaft 5. Thus the feeding disk is automatically adjusted to any height of the cake of soap and the refilling or inspection of the device easily accomplished.

The shaft 5 is adapted to be operated by a lever or handle 27 at the top of the device. To this lever 27 is attached a short shaft 28, to which is attached a support 29 carrying a pawl 30. Said shaft 28 is pivotally mounted upon the end 31 of another short shaft 32 which carries a ratchet wheel 33 positioned so as to be engaged by said pawl 30. This latter short shaft 32 is rotatably mounted in a cross-bar 34 attached to the upper end 2 of the receptacle. The lower end of said shaft 32 is in the form of a sleeve surrounding the pointed end 35 of the shaft 5 and is provided with a cam shaped groove 36 adapted to receive a pin 37 upon said shaft 5, forming a clutch or separable connection between the shafts 32 and 5. The pointed shape of the end 35 and the cam shape of the sleeve 32 have been designed to facilitate the fitting together of said parts when the receptacle and cover are replaced after having been removed for filling the device, etc.

The movement of the lever 27, is limited by the screw 38, which acts as a stop, against the one or the other side of the cross-bar 34. A spring 39 is provided for restoring the lever 27 and connected parts to their original position after the lever has been turned in the direction of the arrow of Fig. 1. A spring 40 holds the pawl in engagement with the ratchet 33. The purpose of the above described ratchet arrangement is to provide a rotation in one direction only of the planetary cutter movement.

The operation of the device as described may be easily understood from the drawing. By turning the handle 27 in the direction of the arrow the pawl 30 is caused to turn the ratchet wheel 33 and its shaft 32. The clutch 36 of said shaft engages the pin 37 and causes the shaft 5 to be turned, thus causing the cutters 10 with their pinions 11 to advance in a rotary direction. The rack 9 at the same time rotates the pinions and the cutters, causing the cutting edges 13 to cut narrow ribbons from the cake of soap 15. The cake of soap is constantly fed against the cutter during this operation by means of the feeding disk 19 which is moved downward by the threaded shaft 5.

The conical shape of the cutters is for the purpose of providing a uniform speed for all of the cutting edges relative to the speed with which the same advance over the surface of the soap, which results in a uniform product of soap shavings. The increasing diameter of the cutter from the central axis with which the cutter revolves provides an increased circumferential speed of the cutting edges which increases substantially in the same proportion as the advancing speed increases from the center outward. When the handle 27 is released it will be returned, with its connected parts, by the spring 39, as before explained, to its initial position, the pawl 30 traveling over the teeth of the ratchet 33, the pressure of the soap against the cutters preventing the shaft 5 from being turned back therewith.

Spiral shaped conveyers, such as 41, attached to the shaft 7 are provided to convey the soap from the interior of the cutters so that the same may fall through the openings 6 of the stationary lower part 3 of the receptacle, and for removing the soap particles that may stick to the walls of said lower part 3 scrapers, such as 42, attached to the shaft 5 and revolving with the same may be provided.

The cutters may be positioned in several different ways with relation to the central shaft. In Figs. 2 and 3 I have shown the cross-shaft upon which said cutters are mounted as perpendicular to the central shaft. In Fig. 4 is shown a modification characterized by the cross-shaft being positioned at an angle with a horizontal line so that the cutting line of the cone, is horizontal. This modification has certain advantages, such as the increased slope of the lowest portion of the cutter, making it possible to dispense with the spiral conveyer for the soap particles, substituting a scraper 43 for the same to keep the inner walls of the drum clean. Another advantage of this modification is that the diameter of the surface of the cake of soap upon which the cutters operate can be increased without increasing the diameter of the receptacle.

In Fig. 6 is shown an automatic lock which prevents the receptacle from being opened when there is soap in the same and is automatically released when the cake of soap is nearly consumed. To accomplish this I employ the usual bayonet joint arrangement of a pin 44 attached to the stationary part 3 of the receptacle and an L-shaped slot 45 in the removable part. A latch 46 pivotally mounted upon the removable part is adapted to engage and hold the pin when the same approaches the end of the slot. Said latch is provided with a projection 47 at one end which is adapted to be engaged by the feeding disk 19 when the same approaches its lowest position. At this point the latch will be raised, releasing the pin 44 and permitting the parts of the receptacle to be separated in the usual manner. When the cover is replaced the pin 44, which then falls behind it, locks the same in position until the soap is nearly consumed when the feeding disk 19 will automatically open the lock as described. This locking arrangement could of course be modified if desired so as to allow the lock to be opened at any time by means of a key.

What I claim is:—

1. In a device for dispensing soap, the combination of a soap container, a hollow conical-shaped cutter, a horizontal shaft supporting said cutter, means for rotating the cutter about its horizontal axis, a conveyer on the shaft and within the cutter, and means for turning the cutter bodily while it is rotating to advance the same over the surface of a cake of soap.

2. In a device for dispensing soap, the combination of a soap container, a hollow conical-shaped cutter, a horizontal shaft supporting said cutter, means for rotating the cutter about its horizontal axis, means for turning the cutter bodily while it is rotating to advance the same over the surface of a cake of soap, and a conveyer in said cutter.

3. In a device for dispensing soap, the combination of a soap container, a hollow cutter, a horizontal shaft supporting said cutter, means for rotating the cutter about its horizontal axis, means for turning the cutter bodily while it is rotating to advance the same over the surface of a cake of soap, and a spiral conveyer arranged in said cutter.

4. In a device for dispensing soap, the combination of a soap container, soap feeding means therein, a conical cutter, means for moving the cutter bodily to advance it over the surface of the soap, and means for effecting rotation of the cutter during its bodily movement aforesaid, said cutter having its larger end remote from the axis of its bodily movement.

5. In a soap dispensing device, the combination of a soap container, comminuting means therein, and soap feeding means comprising a feed screw, a feeding disk, threaded segments mounted on the disk and normally connecting the same with the screw, and spring engaged rods connected with the segments, the container being provided with a groove into which the ends of the said rods are adapted to project at a predetermined point in the movement of the disk whereby to disengage the segments from the feed screw.

6. In a device for dispensing soap, the combination of a receptacle for a cake of soap, said receptacle having two parts adapted to be separated, means adapted to lock said separable parts of the receptacle together, and means adapted to automatically unlock the receptacle when a predetermined amount of the cake of soap has been consumed, comminuting means positioned within said receptacle and adapted to operate upon said cake of soap, and means for operating said comminuting means.

7. In a device for dispensing soap, the combination of a receptacle having one stationary and one removable part, comminuting means connected to one of said parts of the receptacle, means connected to the other of said parts of the receptacle adapted to operate said comminuting means, a feeding device releasably connected to said operating means and adapted to be operated thereby to feed the cake of soap against the comminuting means, means adapted to release said feeding means from said operating means at a predetermined point, and means adapted to automatically adjust the position of said feeding means to the height of the cake of soap when said removable part of said receptacle is replaced.

Signed at New York in the county of New York and State of New York this 8th day of June A. D. 1907.

FRANS GUNNAR AGRELL.

Witnesses:
LEWIS J. DOOLITTLE,
H. W. FORSYTH.